United States Patent
Parker

(10) Patent No.: US 12,259,012 B2
(45) Date of Patent: Mar. 25, 2025

(54) CONSTANT VELOCITY COUPLING

(71) Applicant: Punk Couplings Limited, Bristol (GB)

(72) Inventor: Simon Parker, Bristol (GB)

(73) Assignee: PUNK COUPLINGS LIMITED, Bristol (GB)

( * ) Notice: Subject to any disclaimer, the term of this patent is extended or adjusted under 35 U.S.C. 154(b) by 436 days.

(21) Appl. No.: 17/767,294

(22) PCT Filed: Oct. 8, 2020

(86) PCT No.: PCT/GB2020/052492
§ 371 (c)(1),
(2) Date: Apr. 7, 2022

(87) PCT Pub. No.: WO2021/069898
PCT Pub. Date: Apr. 15, 2021

(65) Prior Publication Data
US 2022/0364610 A1    Nov. 17, 2022

(30) Foreign Application Priority Data

Oct. 9, 2019 (GB) .................................... 1914612
Oct. 9, 2019 (GB) .................................... 1914613
(Continued)

(51) Int. Cl.
*F16D 3/32* (2006.01)
*F16D 3/42* (2006.01)

(52) U.S. Cl.
CPC ................ *F16D 3/32* (2013.01); *F16D 3/42* (2013.01); *Y10S 464/905* (2013.01)

(58) Field of Classification Search
CPC ........... F16D 3/32; F16D 3/42; Y10S 464/905
(Continued)

(56) References Cited

U.S. PATENT DOCUMENTS 1,035,654 A * 8/1912 Swanson .................. F16D 3/38
464/112
3,030,784 A   4/1962 Minik
(Continued)

FOREIGN PATENT DOCUMENTS

AU      2008202059        5/2008
FR       531.269      *  1/1922 .................... 464/125
(Continued)

OTHER PUBLICATIONS

International Search Report and Written Opinion of the International Searching Authority mailed Dec. 16, 2020, in connection with corresponding international Application No. PCT/GB2020/052492 (5 pp.).

*Primary Examiner* — Greg Binda
(74) *Attorney, Agent, or Firm* — NIXON & VANDERHYE P.C.

(57) ABSTRACT

A constant velocity joint comprising two concentric couplings, a first coupling comprising an inner member, an intermediate annular member and an outer annular member, the members being concentric. The inner member of the second coupling is common to the outer member of the first coupling. The members of the couplings are constrained to rotate one with respect to another and the outer member of the second coupling is constrained to rotate angularly in respect of the common member in a way that is the mirror image of the rotation of the inner member with respect to the common member.

11 Claims, 5 Drawing Sheets

(30) Foreign Application Priority Data

Dec. 10, 2019 (GB) ...................................... 1918106
Jan. 30, 2020 (GB) ...................................... 2001273
Jan. 30, 2020 (GB) ...................................... 2001274

(58) Field of Classification Search
USPC ........................................................ 464/125
See application file for complete search history.

(56) References Cited

U.S. PATENT DOCUMENTS

| | | |
|---|---|---|
| 5,094,651 A | 3/1992 | Cornay |
| 2022/0373038 A1* | 11/2022 | Parker ....................... F16D 3/43 |

FOREIGN PATENT DOCUMENTS

| | | |
|---|---|---|
| JP | H04-029621 | 1/1992 |
| WO | 2009/015425 | 2/2009 |

\* cited by examiner

CONSTANT VELOCITY COUPLING

This application is the U.S. national phase of International Application No. PCT/GB2020/052492 filed Oct. 8, 2020, which designated the U.S. and claims priority to GB 1914612.5 filed Oct. 9, 2019, GB 1914613.3 filed Oct. 9, 2019, GB 1918106.4 filed Dec. 10, 2019, GB 2001273.8 filed Jan. 30, 2020, and GB 2001274.6 filed Jan. 30, 2020, the entire contents of each of which are hereby incorporated by reference.

TECHNICAL FIELD

This invention relates to a constant velocity coupling.

BACKGROUND ART

Constant velocity couplings are typically used to couple two shafts often, but not exclusively, in transmission and steering systems.

A double cardan joint consists of two universal joints mounted back to back with a centre yoke. Provided that the angle between the input shaft and centre yoke is equal to the angle between the centre yoke and the output shaft, the second cardan joint will cancel the angular velocity errors introduced by the first cardan joint and the aligned double cardan joint will act as a constant velocity. A slightly smoother joint in operation is a Thompson joint, but it is very much more complex. In sea going vessels couplings having double Cardan Joint arrangement with self-centring mechanism are used to link off-set drive shafts. This arrangement ensures both Cardan joints experience the same angle of misalignment as each other thus forcing a Constant Velocity output. However, such joints are very heavy, and have high inertia forces, and considerable losses through friction. Furthermore, such joints have been known to fail in an uncontrolled manner, which under the high inertial forces experienced by such joints can lead to extensive damage and danger to life.

As an alternative a double yoke joint has been developed, which is smoother in operation but has proven to be unreliable. Wear and centrifugal loadings can cause the joint to break apart in an uncontrolled manner.

This invention seeks to provide a constant velocity joint which can be used in heavy duty applications such as marine propulsion systems and bulldozers and dredgers, is as smooth as the double yoke joint, but which avoids the lack of reliability associated with that design; it also enables other embodiments which are smaller and lighter than known constant velocity joints. In all cases the invention provides constant velocity joints with reduced inertial forces and reduced friction losses compared with known Cardan Joints, and which avoids the failure modes of earlier joints.

DISCLOSURE OF INVENTION

According to the present invention, a constant velocity joint comprises first and second couplings. The second coupling is concentrically disposed around the first coupling. Each coupling comprises an inner member, an outer annular member and an intermediate annular member between the inner and outer members. The members of both couplings are disposed around a common first axis and having a common center on the common axis and in which the outer annular member of the first coupling is also the inner member of the second coupling, thereby being a common annular member of both the first and second couplings. The inner member of the first coupling has an outer periphery and the intermediate member of the first coupling has an inner periphery in which the outer periphery of the inner member of the first coupling received. The intermediate member of the first coupling has an outer periphery and the common annular member has an inner periphery in which the outer periphery of the intermediate second member is received. The common annular member has an outer periphery and the intermediate annular member of the second coupling has an inner periphery in which the outer periphery of the common annular member is received. The intermediate annular member of the second coupling has an outer periphery and the outer annular member of the second coupling has an inner periphery in which the outer periphery of the intermediate annular member of the second coupling is received. The outer peripheries and the inner peripheries are concentric about the common center and complementary to one another; t. The intermediate annular member of the each coupling is constrained by a first or a first pair of opposed axle(s) to rotate with respect to the inner annular member (the common annular member in the case of the second coupling) of the coupling on a first axis perpendicular to the common axis and by a second or a second pair of opposed axle(s) with respect to the outer member of the coupling (the common annular member in the case of the first coupling) on second axis perpendicular to both the common and the first axis. The outer member of the second coupling is constrained to rotate angularly in respect of the common member in a way that is the mirror image of the rotation of the inner member of the first coupling with respect to the common member.

Normally the outer peripheries are convex spherical peripheries and the inner peripheries concave spherical peripheries. However, if contact between the members can be avoided by having a gap between the members maintained by the axles and that gap being sufficiently large, the surfaces can be cylindrical or the outer peripheries are convex or chamfered towards their edges and/or the inner peripheries being chamfered towards their edges.

Having gaps maintained by the axles reduces friction and wear, an additional benefit arises as this arrangement ensures maintenance of the concentricity of the pairs of annular members.

The structure of the joint of the invention is such that any failure of the annular members transmitting power is contained in the joint.

Ideally, but not essentially, the dimensions of the annular members are chosen to provide a small gap between each outer periphery and each inner periphery.

The inner member of the first coupling, the common annular member, and the intermediate members of the first and second couplings normally comprise spherical segments.

With this invention the outer annular member of the second coupling of the joint is constrained to move in a way that is an exact mirror image of the inner first annular member. If a shaft is connected to the side of the outer annular member of the second coupling, it will take up an equal but opposite off-set to a shaft connected to the first inner member when compared to the common annular member and with be driven at exactly the same angular velocity as the shaft connected to the first inner member.

In a first embodiment of the invention, a central axle is mounted in a first, a second intermediate, and a third support means allowing change of the alignment of the central axis, the second intermediate support means being between the first and the third support means and in which the inner annular member of the first coupling is connected to a housing disposed around the first support means; the outer annular member of the second coupling is connected to a housing disposed around the third support means and the common member is connected to a housing disposed around the second intermediate support means, each housing having an aperture around the corresponding support means in which the support means is mounted.

In one implementation of this embodiment the support means are spherical bearings having roller bearings between them and the housings.

Preferably the intermediate member of the inner coupling and the intermediate member of the outer coupling have substantially the same inertial mass.

This is most readily achieved by the material of the intermediate member of the outer coupling being of a lighter material than that of the intermediate member of the inner coupling.

As inertial mass of the intermediate members of the inner and outer couplings are related to mass and radius from the central axis it is possible to match/balance their inertias by use of lighter materials for the larger diameter intermediate annular member of the outer coupling compared to the smaller diameter of the intermediate member of the inner coupling.

In a second embodiment of the invention the inner member of the first coupling, the common annular member, and the outer annular member of the second coupling each have a plurality of pivot mountings on one side of the coupling aligned in a plurality of rows extending radially from the first axis. A plurality of links are arranged in chains of three links, the first link of the of each chain is pivotally mounted onto a pivot mounting on the outer annular member of the second coupling. The third link of each chain is pivotally mounted on the pivot mounting in the same row of pivot mountings on the inner member of the first coupling. The second link in the chain is pivotally mounted on the pivot mounting in the same row of pivot mountings on the common annular member. The second link having, towards opposite ends of the link, pivotal joints with the first and third links. The pivotal mounting of the second link on the common annular member is equidistant between the pivot joints to the first and third links.

Furthermore, as torque is a function of force and distance from the rotation axis, as the intermediate member of the inner coupling has a smaller diameter, the torque loads it experiences are higher thus requiring a stronger material whereas intermediate member of the outer coupling is rather larger in diameter a less strong material can be used for the same torque performance.

Example of suitable combinations of materials are steel EN19 for the intermediate member of the inner coupling and 7000 series aluminium alloy for the intermediate member of the outer coupling. Other materials are possible. However, when inertia matching the focus is mass which is critical. This can also be achieved or fine-tuned with the addition of weights or by drilling holes in the members and/or to compensate for imbalances caused by the variability of the manufacturing processes. It is impossible to predict the relative rotational relationship between the two elements when combined; hence the balancing process needs to be completed on assembly.

As the two intermediate members are dynamically mirrored in their operation secondary moment inertia matching should cancel out any induced associated vibration.

In the case of the inner member of the inner coupling and the outer member of the outer coupling, as these members are constant velocity there is no need to match masses, but the overall double concentric coupling of the invention would benefit in terms of minimum overall mass, as it could be accelerated/decelerated for the minimum energy input. As torque is a function of force over distance the best combination would be with the inner member of the inner coupling being steel and the outer member of the outer coupling being of aluminium or and alloy thereof. This selection can be supported by noting that the inner member of the inner coupling is experiencing the highest torque with the bearing pressure on the splines/keyways and axle housings. The most resilient material is desirable, again pointing to steel in preference to aluminium. Steel also has the advantage that it can be heat treated to improve its local hardness to improve its resilience.

In the case of the common member, namely the outer member of the inner coupling and the inner member of the outer coupling, as this is the non-constant velocity element of the concentric coupling reducing the mass and radius from the central axis to the absolute minimum possible will also reduce the secondary moment of inertia of this element to the absolute minimum to achieve the minimum induced vibration. Suitable materials for the common member are 7000 series aluminium alloys.

As a further step in reducing inertial forces, the diameter of the first axles can be greater than that of the second axles. In addition, the axles associated with the second coupling are smaller than the corresponding axles of the first coupling.

Further to reduce inertial mass further, in the first embodiment, the connection between the common member and the housing for the second support means is bell shaped, as is the connection between the outer member and the housing for the third support means.

BRIEF DESCRIPTION OF DRAWINGS

Examples of the invention are described below with reference to the accompanying drawings, in which.

DESCRIPTION OF EXAMPLES

Figure 1:
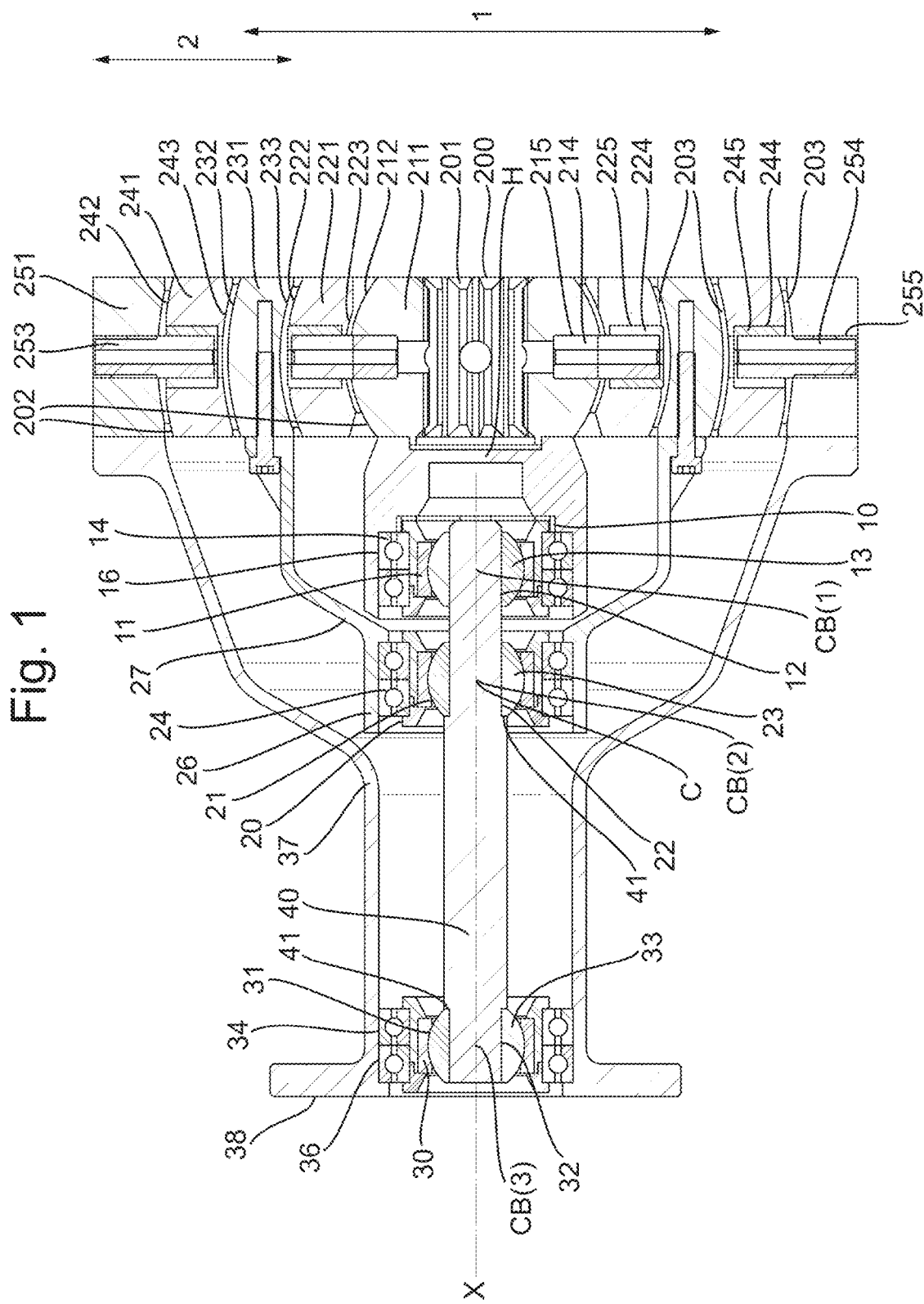
FIG. 1 is a section of an example of a constant velocity joint according to a first embodiment of the invention in the aligned position.

FIGS. 1 to 4 show an example of one embodiment of the invention. A near constant velocity joint for connecting between an input I and an output O comprises concentric a couplings 1 and 2, with coupling 2 disposed around coupling 1, a first support means 10 allowing change of the alignment of the central axis in the form of a first spherical bearing 11 and roller bearing element 14, a second intermediate support means 20 allowing change of the alignment of the central axis in the form of a second intermediate spherical bearing 21 and roller bearing 24, and a third support means 30 allowing change of the alignment of the central axis in the form of a third spherical bearing 31 and roller bearing 34 supporting a shaft 40; the second intermediate support means 20 is between the first and third bearings. The first and second couplings 1, 2 and the first, second and third support means 10, 20, 30, when aligned, are disposed around a central axis H. The couplings 1 and 2 have a first central axis H, the spherical bearings 11, 21, and 31 and the roller bearings 14, 24, 34 have a central axis X. The support means 10, 20, and 30 are mounted in housings 16, 26, and 36 respectively. Cylindrical bosses 13, 23 and 33 are formed on the shaft 40 for support in the spherical bearings 11, 21, 31. The shaft has steps 41, to stop the shaft 40 from falling out of the coupling during operation.

The inner coupling 1 comprises an inner first annular member 211 and intermediate annular member 221 and an outer annular member 231. The annular member 231 is also the inner member of the second outer coupling 2 and is described below as the common annular member 231.

Coupling 2 thus comprises the common annular member 231, an intermediate member 241 and an outer member 251.

The inner member 211 of coupling 1 has a central bore 200 with splines 201 around the bore to receive a splined input output shaft (not shown).

The inner member 211, the intermediate annular members 221 and 241, and the common annular member 231 each comprise spherical segments. Each of the annular members (211, 221, 231, 241, 251) is disposed around common first axis H and have a common centre CC on said first axis H. The common annular member 231 serves as the outer annular member of first coupling 1 which is effectively rigidly attached to the inner member of second coupling 2.

The inner first annular member 211 has an outer convex spherical periphery 212 and the second intermediate annular member has an inner spherical concave periphery 223 in which the outer convex periphery 212 of the inner first annular member 211 is received.

The intermediate annular member 221 of first coupling 1 has an outer convex spherical periphery 222 and the common annular member 231 has an inner spherical concave periphery 233 into which the outer convex periphery 222 of the intermediate annular member is received.

The common annular member 231 has an outer convex spherical periphery 232 and the intermediate annular member 241 of the second coupling 2 has an inner spherical concave periphery 243 in which the outer convex periphery 232 of the common annular member 231 is received.

The intermediate annular member 241 of the second coupling has an outer convex spherical periphery 242 and the outer annular member 251 of the second coupling 2 has an inner spherical concave periphery 253 in which the outer convex periphery 242 of intermediate annular member 241 is received.

A pair of diametrically opposed axles 214 extend from opposed bores 215 in the inner member 211 into bearings 225 fixed in bores 224 in the intermediate annular member 221. The axis of the axles 214 is perpendicular to the common central axis H. The intermediate annular member 221 of coupling 21 is constrained to rotate about the inner member 211 about the second axis perpendicular to the common axis H.

A pair of diametrically opposed axles 234, whose common axis is perpendicular both to the common central axis H and the second axis, is fixed in opposed bores 236 in the common annular member 231 and mounted in bearings 227 and 247 fixed in bores 226 in the intermediate annular member 221 of coupling 21 and bores 246 in the intermediate annular member 241 of coupling 22. The common annular member 231 thus is constrained to rotate about the intermediate annular member 221 and the intermediate annular member 241 about the common annular member 231 on a third axis perpendicular to both the common axis H and the second axis.

A pair of diametrically opposed axles 254 extend from opposed bores 255 in the outer annular member 251 into bearings 245 fixed in bores 244 in the intermediate fourth annular member 241. The axis of the axles 254 is aligned with the second axis perpendicular to the common central axis H. The outer annular member 251 thus is constrained to rotate about the intermediate annular member 241 about the second axis and perpendicular to the common axis H.

The inertial mass of the intermediate member 241 of the second coupling 2 is the same as that of the intermediate member 221 of the first coupling 1. This can conveniently be achieved by the intermediate member 241 of the second coupling 2 being made of an aluminium alloy, such aluminium 7075, and the intermediate member 221 of the first coupling 1 being of steel such as steel EN19. Fine adjustments of the inertial masses of these members 221 and 241, can be made by drilling holes or adding weights to one or other of members 221 or 241 as required.

Gaps 203 are provided between the annular members of couplings 1 and 2.

The appropriate width of the gaps 203 varies according to the intended use of the coupling, the speed of rotation, load profiles, and the materials used in the annular members. However, as a rule, the gaps 203 would be 0.5% of the overall diameter of the coupling concerned where the overall diameter is less than 100 mm, and 1% of when the overall diameter of the coupling concerned is 100 mm in diameter or more.

A splined input shaft (not shown) would engage with the splines 201 in central aperture 200 of the inner member 211 of coupling. Through the common member 231, torque from the input is transmitted to outer annular member 251 of second coupling 2.

The inner member 211 of coupling 1 is connected to the cylindrical housing 16 of the first roller bearing 14.

The common annular member 231 is connected by a cylindrical member 27 to the housing 26 of the second roller bearing 24.

The outer annular member 251 is connected by a cylindrical member 37 to the housing 36 of the third roller bearing 34. The cylindrical member 37 has a flange 38 around the housing 36 to which can be connected to an output shaft (not shown).

An axle 40 having a central axis X is supported in the central apertures 12, 22, 32 of the spherical bearings 11, 21, 31, but is not connected to them so is free to rotate about its axis X independently in those bearings so no torque is transmitted though the axle 40. The effect of the axle 40 is to ensure that the axes of the spherical bearing are always aligned with the axis X of the axle 40, with the centres of the bearings CB(1), CB(2), and CB(3) on the axis X.

It has been found that unless roller bearings 14, 24, and 34 are provided around the spherical bearings 11, 21, 31 respectively, excessive wear occurs between the inner and outer parts of the spherical bearings.

The joint described in FIGS. 1 to 4 retains the outer annular member 251 of the second coupling 2 and the support means 30 in a fixed relationship with one another, with rotation of the input transmitted to the output.

Figure 2:
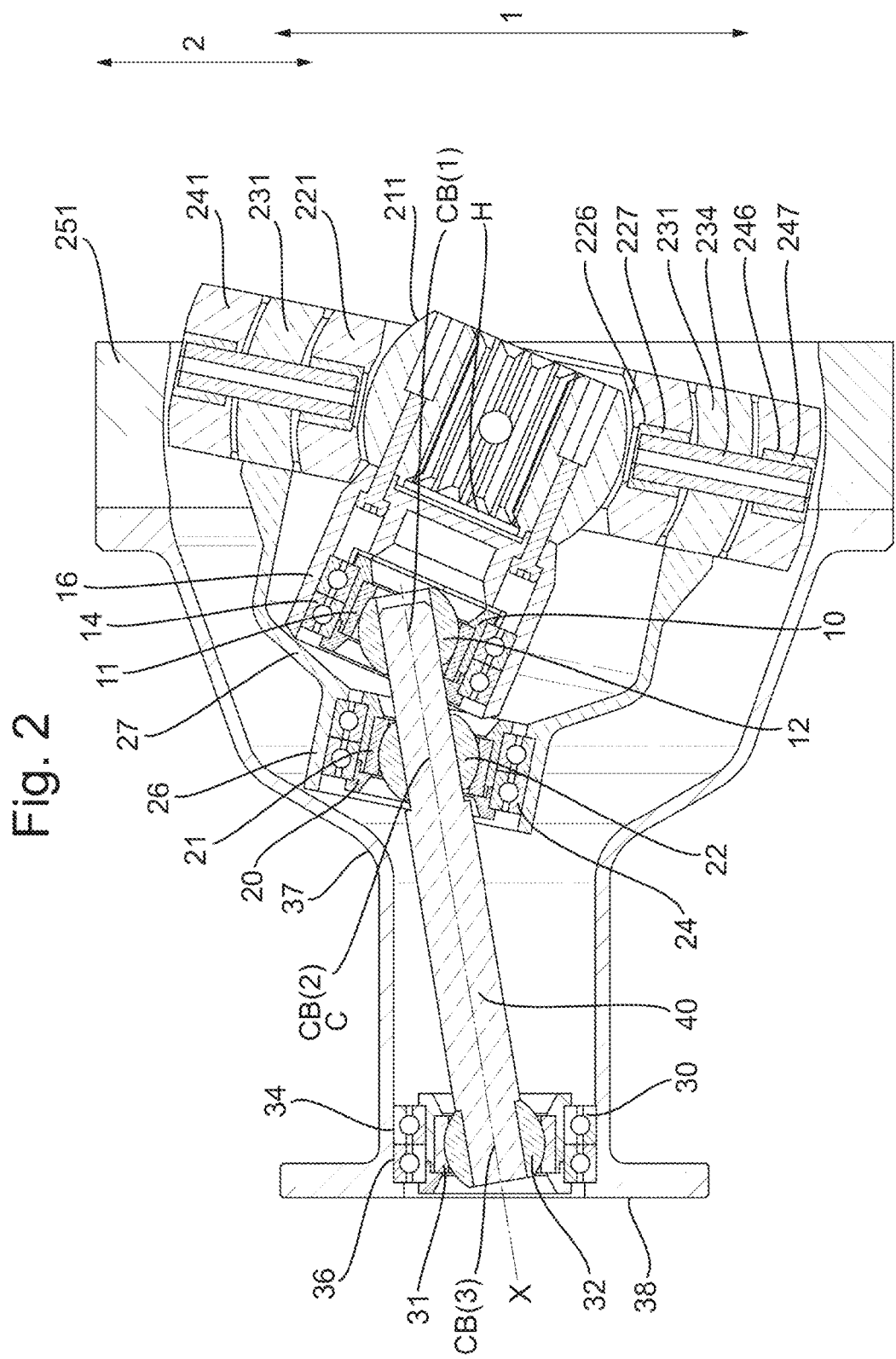
FIG. 2 is a section of the joint shown in FIG. 1, orthogonal to that of FIG. 1 but in a misaligned position.

The effect of misaligned input and output on the joint is shown in FIG. 2. An output shaft connects to flange 38 will be driven at exact the same angular velocity as the shaft connect to the inner member 211.

The members 27 and 37 are bell shaped. The wider portion of the cylinder 27 is to join with the common member 231 and to avoid conflict with the movement of the housing 16 and roller bearings 14 around the spherical bearing 10, the cross section of the cylinder is narrowed towards the housing 26. Likewise, the wider portion of the cylinder 37 is to join with the outer member 251 and to avoid conflict with the movement of the housing 26 and roller bearing 14 around the spherical bearing 11, the cross section of the cylinder is narrowed towards the housing 36. Adoption of the bell shapes as described reduces considerably the off-axis inertial forces and secondary moments of inertia and thus reducing vibration.

As described, the outer peripheries of member 211, 221, 231, and 241 are convex spherical peripheries and the inner peripheries of members 221, 231, 241, and 251 are concave spherical peripheries. As contact between the members can be avoided by having the gap 203 maintained by the axles between the members and if that gap is sufficiently large, the peripheries surfaces can be cylindrical. Alternatively, the peripheries can be chamfered towards their edges. The axles 214, 234 and 254 maintaining the gaps also maintain the concentricity of the members of couplings 1 and 2.

In the embodiments shown FIGS. 1 to 4, the first 1 and second 2 couplings pivot about a centre C coinciding with the centre CB(2) of the second support means 20. When there is no misalignment of the couplings, the central axis H of the first and second couplings 1 and 2 aligns with the axis X. The distances between the centre of coupling 1 and support means 10, 20 and 30 are chosen through simple geometry to ensure that the pivotal centre of couplings 1 and 2 about support means 20 is always at C—the centre CB(2) of spherical bearing 21 for the designed preferred operational misalignment between an input applied to the inner member 211 and an output taken from the flange 38. In this configuration, the angle of the output to the common member 231 is equal but opposite to the angle of the input in the common annular member 231.

The axle 40, when the constant velocity coupling joins off-set input and output shafts, takes up a fixed position in space relative to the off-set input and output concerned. As a result, and in contrast to known constant velocity joints, no conical motion occurs avoiding the wear that occurs on contacting surfaces in know-prior art constant velocity joints leading, in many cases, to eventual failure. Furthermore, the support arrangements for the axle 40, mean that no torsional loads are transmitted through the axle 40, avoiding any risk of failure of the axle.

Although the joints would normally be designed for a preferred misalignment between input and output and will provide a constant angular output corresponding to a constant angular input, it can cope with a spectrum of angular misalignments about the designed misalignment, with only negligible deviations in the constant velocity output O.

In large constant velocity couplings of the kind described in FIGS. 1 to 4, it has been found that it may be desirable to interchange the positions of the roller bearings 14, 24, 34 with their corresponding spherical bearings 10, 20 and 30, so that the roller bearings 14, 24, and 34 are around the shaft 40 and the spherical bearings 11, 21, and 31 support the shaft and roller bearings in the housings 16, 26 and 36. This arrangement for the intermediate support means 20 is illustrated in FIG. 5. The cylindrical bosses 13, 13 and 33 are around the periphery of the roller bearings 14, 24 and 34 respectively, not around the shaft 40.

An alternative embodiment implementing the invention is shown in FIG. 5

Figure 3:
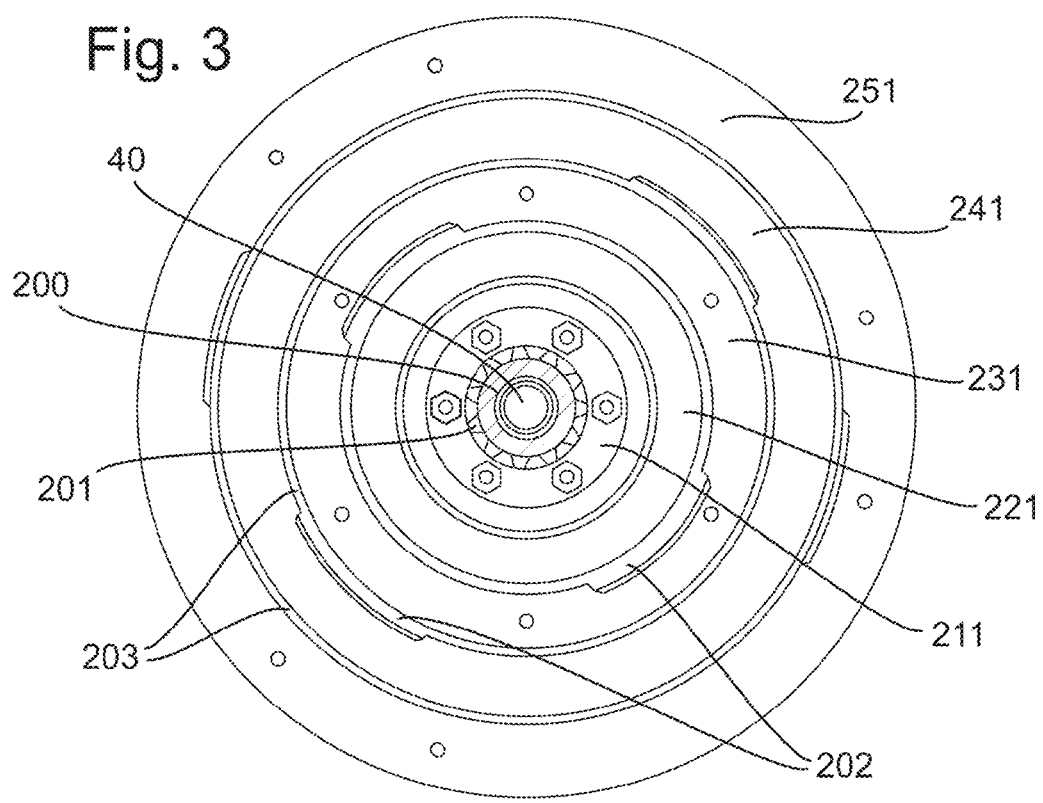
FIG. 3 is an end on view of the example of figures looking towards the first and second concentric couplings of a constant velocity joint according the invention.
Figure 4:
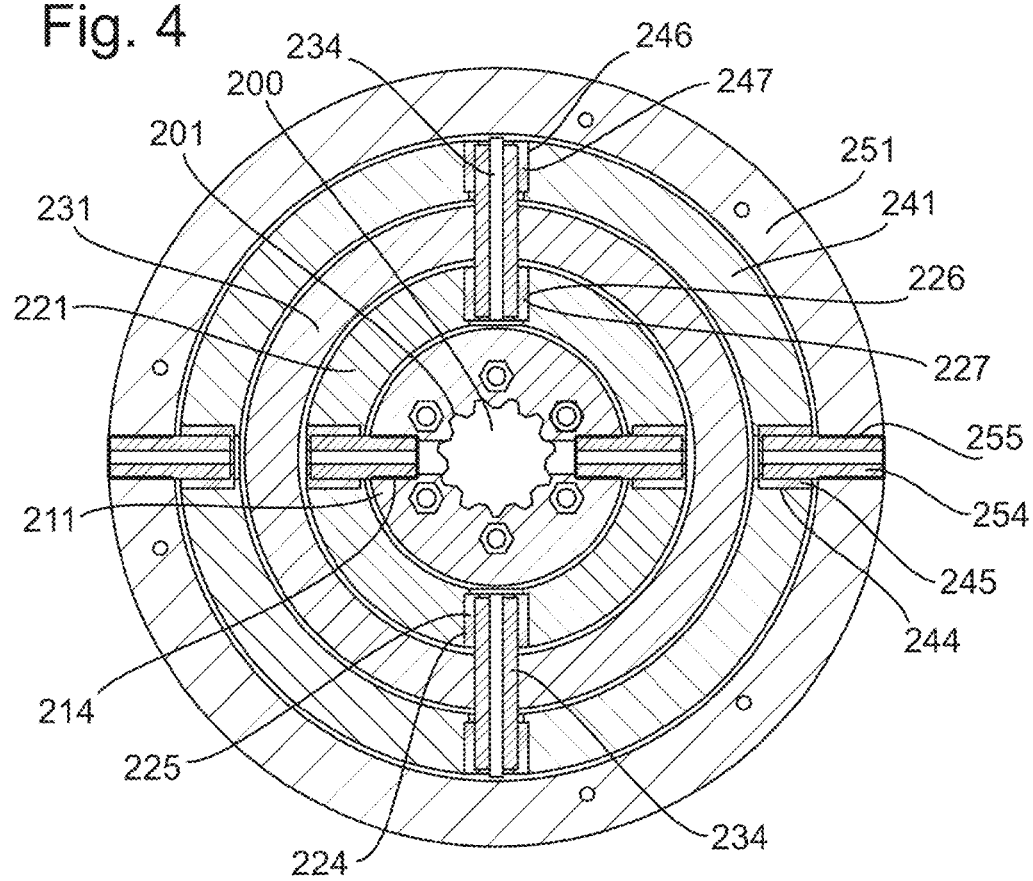
FIG. 4 is a vertical section though the first and second couplings of FIG. 3.
Figure 5:
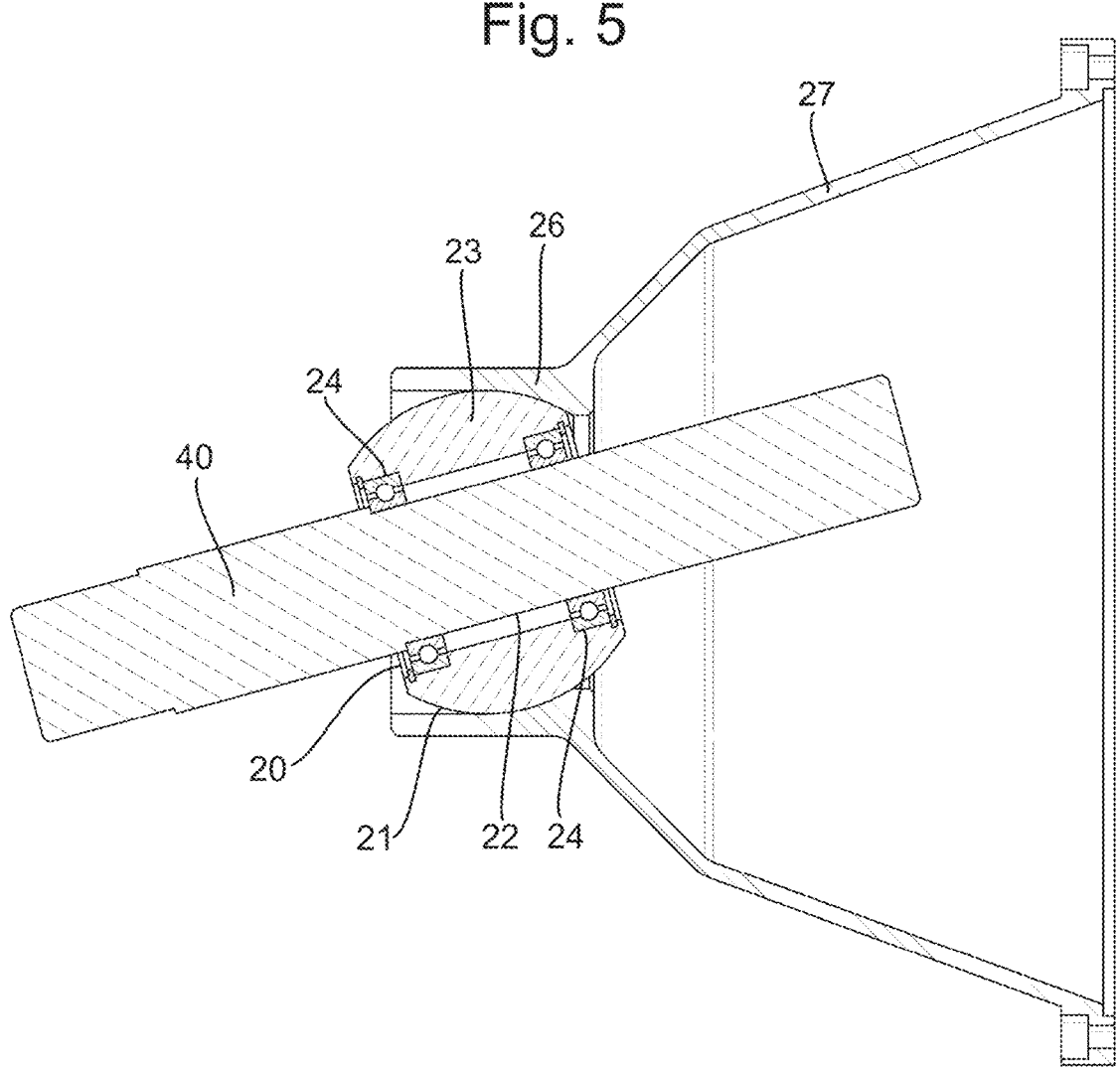
FIG. 5 shows an alternative arrangement for the support means for the central axle of the constant velocity joint of figures to 1 to 4.
Figure 6:
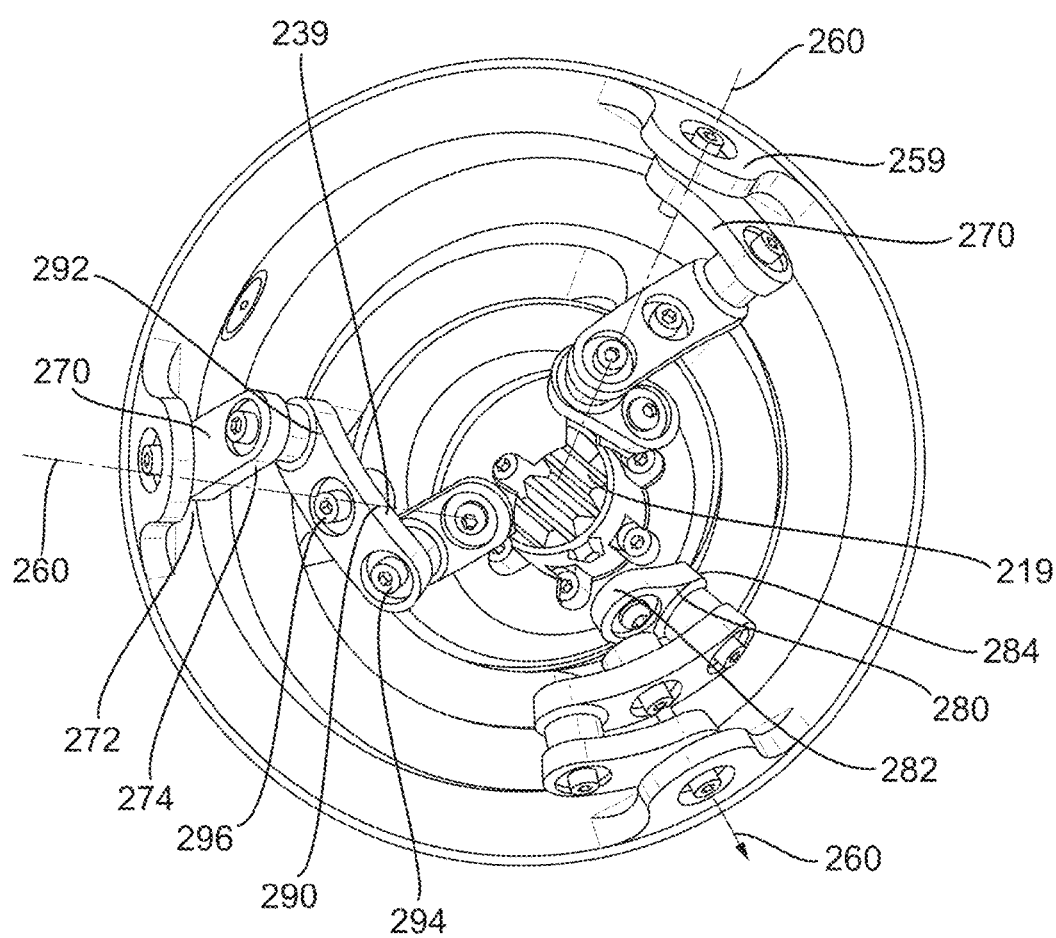
FIG. 6 is an end on view of a second example of a constant velocity joint according to the invention, misaligned, showing chains of links.

The joint has two concentric couplings 1 and 2 as shown in FIGS. 3 and 4. However rather than the rotation of common member, otherwise than in respect of central axis H being constrained as described with reference to FIGS. 1 and 2, the inner member 211 of coupling 1, common annular member annular member 231 and the outer annular member 251 of coupling 2 each have s plurality of pivot mountings in the form of lugs (219, 239, 259). The pivot mountings 219, 239 and 259 are aligned in three rows 260 extend radially from the first axis H. Three chains of links 262, each chain comprising three rigid links 270, 280, 290, are provided. The axes of pivot mounts 219, 239, 259 always pass through the centre point CC in both the aligned and misaligned condition of the joint.

The first link 270 is a chain is pivotally mounted towards one end 272 on the pivot mounting 259 on the outer annular member 251 of the second coupling and towards the other end 274 of the link 270 is pivotally mounted on a pivot mounting 292 towards the one end of second link 290, which is an intermediate link between the first link 270 and a third link 280. Third link 280 is pivotally mounted towards one end 282 of the link 280 on the pivot mounting 219 on the inner member 211 of the first coupling 1 and towards the end 284 of the link 280 opposite pivot mounting 292 to a pivot mounting 294. The second link 290 is mounted midway 296 between its ends on the pivot mounting 239 on common annular member.

The links 270, 280, 290 are curved inwards towards the annular members the curve of each link is part of a hollow sphere. The radius of curvature of link 270 is the same as the intermediate annular member 241, the radius of curvature of link 280 is the same as the intermediate annular member 221, and that of the second link 290 is same as that of the common annular member 231.

The lugs 239 and 259 extending from the common annular member 231 and the outer annular member 251 are segments of a spheres whose radii corresponds to the radius of the common annular member 231 or outer annular member 251 respectively. The pivotal mounting associated with the lug 219 extending from the inner member 211 is at an angle of approximately 45° to the first axis H. This structure avoids possible clashes in use between the curved links and the pivot mountings.

The outer annular member 251 of the coupling 2 is constrained to a position that is exact mirror image of the inner member 211 in the common member 231. A shaft connected to the side of the outer annular member 251 of coupling 2 will take up an equal but opposite off-set to a shaft connected to the inner member coupling 1 seen from the common annular member 231 and will be driven at exact the same angular velocity as the shaft connect to the inner member 211.

The invention claimed is:
1. A constant velocity joint comprising first and second couplings wherein
   the second coupling is disposed concentrically around the first coupling, each coupling comprising an inner member, an outer annular member and an intermediate annular member between the inner and outer members;
   the members of both couplings are disposed around a common first axis and having a common centre on the common first axis;

the outer annular member of the first coupling is also the inner member of the second coupling thereby being a common annular member of both the first and second couplings;

the inner member of the first coupling has an outer spherical periphery and the intermediate member of the first coupling has an inner periphery in which the outer periphery of the inner member of the first coupling is received;

the intermediate member of the first coupling has an outer spherical periphery and the common annular member has an inner periphery in which the outer periphery of the intermediate second member is received;

the common annular member has an outer spherical periphery and the intermediate annular member of the second coupling has an inner periphery in which the outer periphery of the common annular member is received;

the intermediate annular member of the second coupling has an outer spherical periphery and the outer annular member of the second coupling has an inner periphery in which the outer periphery of the intermediate annular member of the second coupling is received;

the outer peripheries and the inner peripheries being concentric about the common centre and complementary to one another;

the intermediate annular member of the each coupling is constrained by a first pair of opposed axles to rotate with respect to the inner annular member of the coupling on a first axis perpendicular to the common axis and by a second pair of opposed axles with respect to the outer member of the coupling on a second axis perpendicular to both the common and the first axis; and wherein the first axis of the outer coupling is the same as the second axis of the inner coupling and the outer member of the second coupling is constrained to rotate angularly in respect of the common member in a way that is the mirror image of the rotation of the inner member of the first coupling with respect to the common member.

2. A constant velocity joint as claimed in claim 1 having a gap between each outer periphery and each inner periphery and one end of each axle is fixed in one of the members and the other end of each axle is supported in a bearing in the other of the members, each bearing having an inner end face acting on the end of the axle supported in the bearing.

3. A constant velocity joint as claimed in claim 2 in which the gap is 0.5% of an overall coupling diameter of if the overall coupling diameter of is 100 mm or less and 1% of the overall coupling diameter if the overall coupling diameter is more than 100 mm.

4. A constant velocity joint as claimed in claim 1 wherein the outer peripheries of the inner and intermediate members are convex spherical peripheries and the inner peripheries of the outer and intermediate members are concave spherical peripheries.

5. A constant velocity joint as claimed in claim 1 wherein a central axle is mounted in a first support means, a second intermediate support means, and a third support means, the second intermediate support means being between the first support means and the third support means;

the inner annular member of the first coupling is connected to a first housing disposed around the first support means;

the outer annular member of the second coupling is connected to a second housing disposed around the third support means;

the common member is connected to a third housing disposed around the second intermediate support means; and each housing has an aperture around the corresponding support means in which the support means is mounted.

6. A constant velocity joint as claimed in claim 5 wherein the support means comprise spherical bearings with roller bearings supporting the spherical bearings in the housings.

7. A constant velocity joint as claimed in claim 6 wherein each support means comprises a boss mounted around the central axle, the boss being mounted in a spherical bearing, a roller bearing being disposed around and supporting spherical bearing in the corresponding housing.

8. A constant velocity joint as claimed in claim 6 wherein each support means comprises a roller bearing around the central axle, a boss disposed around the roller bearing and mounted in a spherical bearing, the spherical bearing being mounted in the corresponding housing.

9. A constant velocity joint as claimed in claim 5 wherein the outer annular member of the second coupling is connected to the housing in which the third support means is mounted by a bell-shaped member whose axis coincides with the central axle.

10. A constant velocity joint as claimed in claim 9 wherein the common annular member is connected to the housing in which the second support means is mounted by a further bell-shaped member whose axis coincides with the central axle.

11. A constant velocity joint as claimed in claim 1 wherein the intermediate member of the inner coupling and the intermediate member of the outer coupling have the same inertial mass.

* * * * *